US012749821B2

(12) United States Patent
John et al.

(10) Patent No.: US 12,749,821 B2
(45) Date of Patent: Sep. 29, 2026

(54) REDUCING AZIMUTH-ELEVATION CORRELATION IN AN ANTENNA ARRAY STRUCTURE

(71) Applicant: Qorvo US, Inc., Greensboro, NC (US)

(72) Inventors: Matthias John, Newtownmountkennedy (IE); Abdallah Dhouibi, Toulouse (FR)

(73) Assignee: Qorvo US, Inc., Greensboro, NC (US)

( * ) Notice: Subject to any disclaimer, the term of this patent is extended or adjusted under 35 U.S.C. 154(b) by 23 days.

(21) Appl. No.: 18/751,794

(22) Filed: Jun. 24, 2024

(65) Prior Publication Data

US 2025/0038423 A1 Jan. 30, 2025

Related U.S. Application Data

(60) Provisional application No. 63/528,944, filed on Jul. 26, 2023.

(51) Int. Cl.
*H01Q 21/00* (2006.01)
*H01Q 1/50* (2006.01)

(52) U.S. Cl.
CPC ........... *H01Q 21/0006* (2013.01); *H01Q 1/50* (2013.01)

(58) Field of Classification Search
CPC ...... H01Q 21/0006; H01Q 1/50; H01Q 1/523; H01Q 1/38; H01Q 21/06
See application file for complete search history.

(56) References Cited

U.S. PATENT DOCUMENTS 8,451,189 B1 5/2013 Fluhler
8,810,455 B2 8/2014 Achour et al.
(Continued)

FOREIGN PATENT DOCUMENTS

EP 2256860 A1 * 12/2010 .............. H01Q 5/42
IN 202031026590 A 12/2021
(Continued)

OTHER PUBLICATIONS

Svantesson, et al., "Mutual Coupling Effects on the Capacity of Multielement Antenna Systems," International Conference on Acoustics, Speech, and Signal Processing, Feb. 2001, Salt Lake City, Utah, IEEE, 5 pages.
(Continued)

*Primary Examiner* — Seung H Lee
(74) *Attorney, Agent, or Firm* — Withrow & Terranova, P.L.L.C.

(57) ABSTRACT

Reducing azimuth-elevation correlation in an antenna array structure is provided. Herein, an antenna array structure is configured to include multiple active antenna elements and a single passive antenna element. In an embodiment, the active antenna elements are each coupled to a respective antenna port and the passive antenna element is isolated from all of the antenna ports. In other words, the passive antenna element acts as a dummy antenna element that can absorb electromagnetic energy of a radio frequency (RF) signal but does not provide the received RF signal to any of the antenna ports. The presence of the passive antenna element makes it possible to reduce an azimuth-elevation correlation between each orthogonal pair of active antenna elements in the antenna array structure to thereby improve accuracy of phase-difference-of-arrival (PDoA) measurements and location determination in an azimuth-elevation coordinate system.

17 Claims, 8 Drawing Sheets

(56) References Cited

U.S. PATENT DOCUMENTS

| | | | |
|---|---|---|---|
| 10,340,599 B2 | 7/2019 | Tayfeh Aligodarz et al. | |
| 10,461,433 B2 | 10/2019 | Smith et al. | |
| 11,041,936 B1 | 6/2021 | Wall et al. | |
| 11,128,058 B2 | 9/2021 | Dotlic et al. | |
| 11,448,725 B2 | 9/2022 | Iwasa et al. | |
| 2006/0192721 A1* | 8/2006 | Goldberg | H01Q 1/38 343/834 |
| 2016/0020165 A1 | 1/2016 | Kamgaing et al. | |
| 2019/0149104 A1 | 5/2019 | Suravarapu et al. | |
| 2019/0333882 A1 | 10/2019 | Kamgaing et al. | |
| 2020/0194862 A1 | 6/2020 | Kamo et al. | |
| 2024/0004017 A1 | 1/2024 | Dhouibi et al. | |

FOREIGN PATENT DOCUMENTS

| | | | |
|---|---|---|---|
| WO | 2009064926 A1 | 5/2009 | |
| WO | WO-2022114564 A1 * | 6/2022 | H01Q 5/25 |

OTHER PUBLICATIONS

Holzman, E., "On the Use of Dummy Elements to Match Edge Elements in Transmit Arrays," 2013 IEEE International Symposium on Phased Array Systems and Technology, Oct. 15-18, 2013, Waltham, MA, USA, IEEE, 5 pages.

* cited by examiner

REDUCING AZIMUTH-ELEVATION CORRELATION IN AN ANTENNA ARRAY STRUCTURE

RELATED APPLICATIONS

This application claims the benefit of U.S. provisional patent application Ser. No. 63/528,944, filed on Jul. 26, 2023, the disclosure of which is hereby incorporated herein by reference in its entirety.

FIELD OF THE DISCLOSURE

The technology of the disclosure relates generally to an antenna array structure configured to reduce azimuth-elevation correlation and mutual coupling.

BACKGROUND

Phase-Difference-of-Arrival (PDoA) is a technique for determining an Angle-of-Arrival (AoA) of a signal at a receiver. The determined AoA, in combination with a Time-of-Flight (ToF) of the signal between a transmitter and the receiver, makes it possible to calculate a three-dimensional (3D) coordinate (x, y, z) of the transmitter in an azimuth-elevation coordination system.

In this regard, FIG. 1 is a schematic diagram of an exemplary azimuth-elevation coordinate system 10, wherein a 3D coordinate (x, y, z) of a transmitter 12 can be determined by receiving a radio frequency (RF) signal 14 transmitted from the transmitter 12 using multiple receiving antennas $ANT_1$, $ANT_2$, $ANT_3$ located at a receiver 16. In this example, the transmitter 12 is located at an arbitrary point P corresponding to the 3D coordinate (x,y,z). The antennas $ANT_1$ and $ANT_2$ are aligned along an x-axis, while the antennas $ANT_2$ and $ANT_3$ are aligned along a y-axis. Each of the antennas $ANT_1$, $ANT_2$, $ANT_3$ can absorb (a.k.a. receive) the RF signal 14 transmitted from the transmitter 12 with a respective azimuth and/or elevation angle.

Herein, the azimuth angle refers to an angle in the x-z plane, measured clockwise from the z-axis along a local horizon of the antennas $ANT_1$, $ANT_2$, $ANT_3$ (e.g., the x-axis). The elevation angle, on the other hand, refers to a vertical angular distance measured up from the local horizon (e.g., the x-axis) toward the North (e.g., the y-axis).

Specifically, a first antenna pair $ANT_1$, $ANT_2$ can collectively measure a first PDoA angle $\alpha$ and a second antenna pair $ANT_2$, $ANT_3$ can collectively measure a second PDoA angle $\phi$ (a.k.a. elevation measurement). Accordingly, a third PDoA angle $\theta$ (a.k.a. azimuth measurement) can be determined based on equation (Eq. 1) below.

$$\mathrm{abs}(\theta) = \cos^{-1}\left(\frac{\sqrt{\cos^2\alpha - \sin^2\phi}}{\cos\phi}\right) \qquad \text{(Eq. 1)}$$

$$\mathrm{sign}(\theta) = \mathrm{sign}(\alpha)$$

Notably, if $\phi=\pm 90°$ and $\cos\phi=0$, the equation (Eq. 1) is not defined. As a result, the arbitrary point P is on the y-axis and the azimuth angle is undefined.

Ideally, the azimuth measurement by the first antenna pair $ANT_1$, $ANT_2$ shall not be affected by an elevation angle of the transmitter 12 and the elevation measurement by the second antenna pair $ANT_2$, $ANT_3$ shall not be affected by an azimuth angle of the transmitter 12. This is, however, not the case in reality. Often times, the azimuth measurement by the first antenna pair $ANT_1$, $ANT_2$ will be affected by a presence of the antenna $ANT_3$, and the elevation measurement by the second antenna pair $ANT_2$, $ANT_3$ will be affected by presence of the antenna $ANT_1$. In context of the present disclosure, the interdependency between the azimuth measurement by the first antenna pair $ANT_1$, $ANT_2$ and the elevation measurement by the second antenna pair $ANT_2$, $ANT_3$ is conveniently referred to as an "azimuth-elevation correlation." As such, it is desirable to reduce the azimuth-elevation correlation between the first antenna pair $ANT_1$, $ANT_2$ and the second antenna pair $ANT_2$, $ANT_3$.

SUMMARY

Aspects disclosed in the detailed description include reducing azimuth-elevation correlation in an antenna array. Herein, an antenna array structure is configured to include multiple active antenna elements and a single passive antenna element. In an embodiment, the active antenna elements are each coupled to a respective antenna port and the passive antenna element is isolated from all of the antenna ports. In other words, the passive antenna element acts as a dummy antenna element that can absorb electromagnetic energy of a radio frequency (RF) signal but does not provide the received RF signal to any of the antenna ports. The presence of the passive antenna element makes it possible to reduce an azimuth-elevation correlation between each orthogonal pair of active antenna elements in the antenna array structure to thereby improve accuracy of phase-difference-of-arrival (PDoA) measurements and location determination in an azimuth-elevation coordinate system.

In one aspect, an antenna array structure is provided. The antenna array structure includes a radiating layer. The radiating layer includes multiple active antenna elements. Each of the multiple active antenna elements is coupled to a respective one of multiple antenna ports. Each of the multiple active antenna elements is configured to absorb an RF signal transmitted by a transmitter in a frequency band. Each of the multiple active antenna elements is also configured to feed the RF signal to the respective one of the multiple antenna ports. The radiating layer also includes at least one passive antenna element. The at least one passive antenna element is configured to absorb and isolate the RF signal from each of the multiple antenna ports.

In another aspect, a wireless device is provided. The wireless device includes an antenna array structure. The antenna array structure includes multiple active antenna elements. Each of the multiple active antenna elements is coupled to a respective one of multiple antenna ports. Each of the multiple active antenna elements is configured to absorb an RF signal transmitted by a transmitter in a frequency band. Each of the multiple active antenna elements is also configured to feed the RF signal to the respective one of the multiple antenna ports. The antenna array structure also includes at least one passive antenna element. The at least one passive antenna element is configured to absorb and isolate the RF signal from each of the multiple antenna ports.

In another aspect, a method for fabricating an antenna array structure is provided. The method includes providing a radiating layer in the antenna array structure. The method also includes providing multiple active antenna elements in the radiating layer and coupling each of the multiple active antenna elements to a respective one of multiple antenna ports. The method also includes configuring each of the multiple active antenna elements to absorb an RF signal transmitted by a transmitter in a frequency band. The method also includes configuring each of the multiple active antenna elements to feed the RF signal to the respective one of the multiple antenna ports. The method also includes providing at least one passive antenna element in the radiating layer. The method also includes configuring the at least one passive antenna element to absorb and isolate the RF signal from each of the multiple antenna ports.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1:
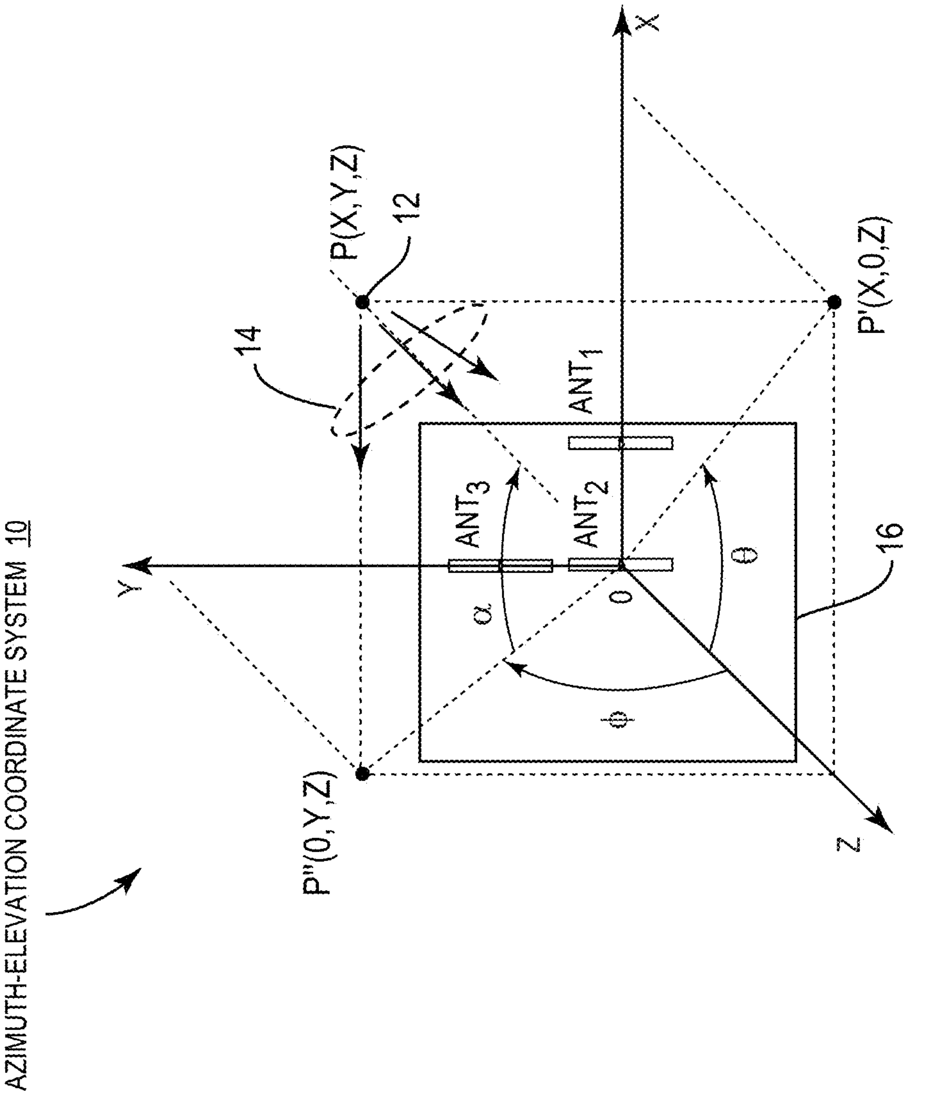
FIG. 1 (RELATED ART)
FIG. 1 is a schematic diagram of an exemplary azimuth-elevation coordination system, wherein a 3D coordinate (x, y, z) of a transmitter can be determined by receiving a radio frequency (RF) signal transmitted from the transmitter using multiple receiving antennas located at a receiver.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include reducing azimuth-elevation correlation in an antenna array. Herein, an antenna array structure is configured to include multiple active antenna elements and a single passive antenna element. In an embodiment, the active antenna elements are each coupled to a respective antenna port and the passive antenna element is isolated from all of the antenna ports. In other words, the passive antenna element acts as a dummy antenna element that can absorb electromagnetic energy of a radio frequency (RF) signal but does not provide the received RF signal to any of the antenna ports. The presence of the passive antenna element makes it possible to reduce an azimuth-elevation correlation between each orthogonal pair of active antenna elements in the antenna array structure to thereby improve accuracy of phase-difference-of-arrival (PDoA) measurements and location determination in an azimuth-elevation coordinate system.

Figure 2A:
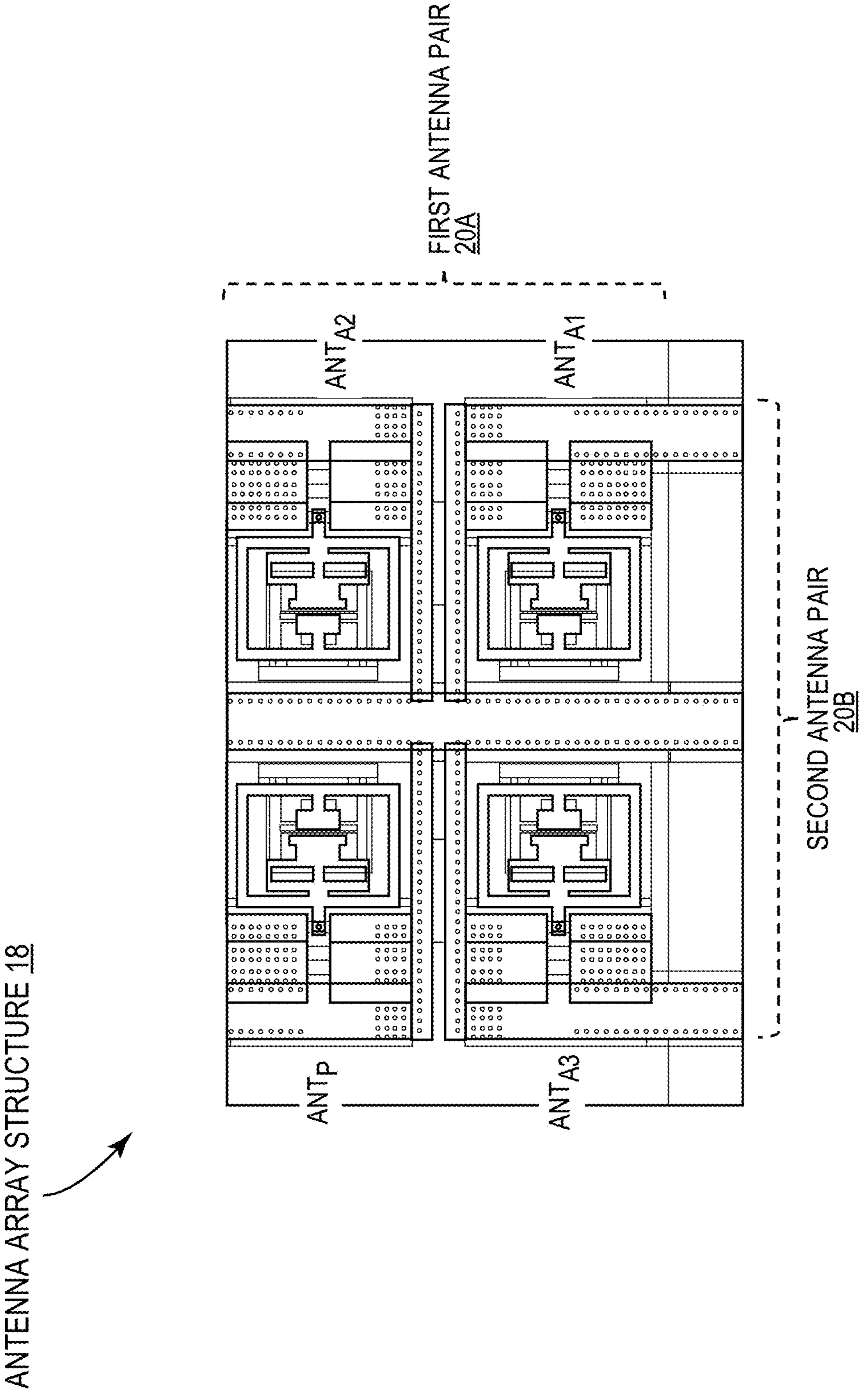
FIG. 2A is a schematic diagram providing an exemplary top view of an antenna array structure configured according to an embodiment of the present disclosure to reduce azimuth-elevation correlation between multiple orthogonal pairs of active antenna elements.

FIG. 2A is a schematic diagram providing an exemplary top view of an antenna array structure 18 configured according to an embodiment of the present disclosure to reduce an azimuth-elevation correlation between multiple orthogonal antenna pairs 20A, 20B. In an embodiment, the antenna array structure 18 includes multiple active antenna elements $ANT_{A1}$, $ANT_{A2}$, $ANT_{A3}$, and a single passive antenna element $ANT_P$. Notably, the illustration provided herein is merely an example and shall not be interpreted as a hard limitation as to how many active and/or passive antenna elements the antenna array structure 18 can actually include.

In an embodiment, the active antenna elements $ANT_{A1}$ and $ANT_{A2}$ collectively form a first antenna pair 20A, and the active antenna elements $ANT_{A1}$ and $ANT_{A3}$ collectively form a second antenna pair 20B. The first antenna pair 20A can enable a measurement of the second PDoA angle $\phi$ (a.k.a. an elevation PDoA angle) in FIG. 1 and the second antenna pair 20B can enable a measurement of the first PDoA angle $\alpha$ (a.k.a. an azimuth PDoA angle) in FIG. 1. As such, the first antenna pair 20A and second antenna pair 20B can be said to be orthogonally related to each other.

The passive antenna element $ANT_P$ can be configured to decorrelate the elevation measurement performed via the first antenna pair 20A and the azimuth measurement performed via the second antenna pair 20B. By providing the passive antenna element $ANT_P$ in the antenna array structure 18, it is possible to reduce the azimuth-elevation correlation between the first antenna pair 20A and the second antenna pair 20B to thereby improve the accuracy of PDoA measurements and location determination in the azimuth-elevation coordinate system 10 of FIG. 1.

Figure 2B:
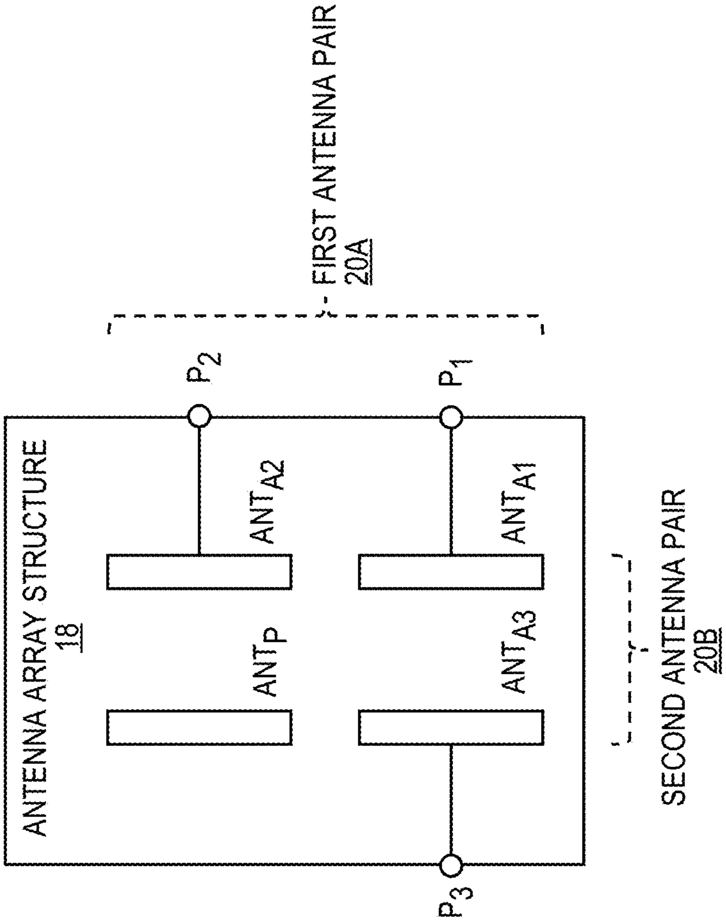
FIG. 2B is a schematic diagram providing a simplified top view of the antenna array structure of FIG. 2A.

FIG. 2B is a schematic diagram providing a simplified top view of the antenna array structure 18 of FIG. 2A. Common elements between FIGS. 2A and 2B are shown therein with common element numbers and will not be re-described herein.

Herein, the active antenna elements $ANT_{A1}$, $ANT_{A2}$, $ANT_{A3}$ are each coupled to a respective one of multiple antenna ports $P_1$, $P_2$, $P_3$, which can be further coupled to a transceiver circuit (not shown). The passive antenna element $ANT_P$, on the other hand, is isolated (not connected to) from any of the antenna ports $P_1$, $P_2$, $P_3$. The active antenna elements $ANT_{A1}$, $ANT_{A2}$, $ANT_{A3}$ and the passive antenna element $ANT_P$ can all absorb electromagnetic energy to thereby receive an RF signal (not shown). While the active antenna elements $ANT_{A1}$, $ANT_{A2}$, $ANT_{A3}$ can feed the received RF signal to the antenna ports $P_1$, $P_2$, $P_3$, respectively, the passive antenna element $ANT_P$ will terminate the received RF signal. As such, the passive antenna element $ANT_P$ can be treated as a terminator or a dummy antenna element. The sole purpose of the passive antenna element $ANT_P$ is to decorrelate the azimuth measurement from the elevation measurement.

Figure 3A:
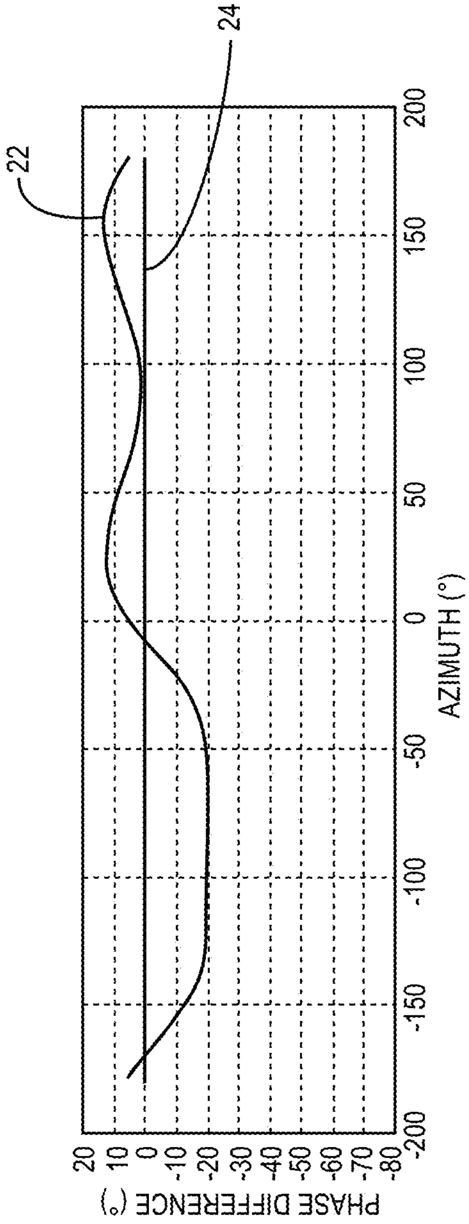
FIGS. 3A and 3B are graphic diagrams illustrating a result of azimuth-elevation correlation reduction achieved by the antenna array structure of FIG. 2A.

FIG. 3A is a graphic diagram providing an exemplary illustration as to how the passive antenna element $ANT_P$ can decorrelate the azimuth measurement performed through the first antenna pair 20A from a presence of the second antenna pair 20B. Herein, a first curve 22 illustrates a varying azimuth measurement performed through the first antenna pair 20A without the passive antenna element $ANT_P$ and a second curve 24 illustrates a constant azimuth measurement performed through the first antenna pair 20A with the passive antenna element $ANT_P$. It is thus evident from FIG. 3A that the passive antenna element $ANT_P$ can effectively decorrelate the azimuth measurement performed through the first antenna pair 20A from the presence of the second antenna pair 20B.

Figure 3B:
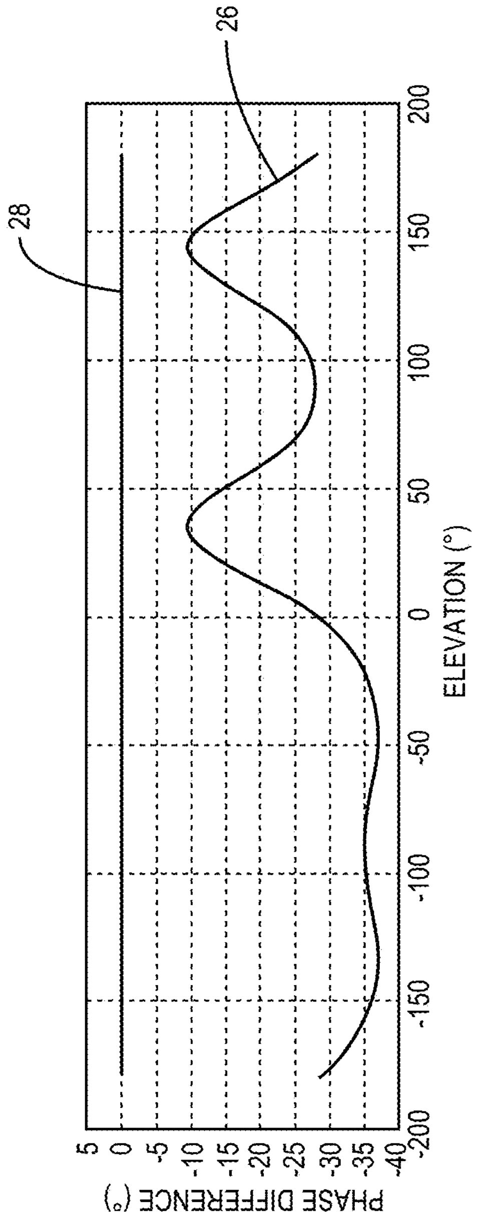

FIG. 3B is a graphic diagram providing an exemplary illustration as to how the passive antenna element $ANT_P$ can decorrelate the elevation measurement performed through the second antenna pair 20B from a presence of the first antenna pair 20A. Herein, a first curve 26 illustrates a varying elevation measurement performed through the second antenna pair 20B without the passive antenna element $ANT_P$ and a second curve 28 illustrates a constant elevation measurement performed through the second antenna pair 20B with the passive antenna element $ANT_P$. It is thus evident from FIG. 3B that the passive antenna element $ANT_P$ can effectively decorrelate the elevation measurement performed through the second antenna pair 20B from the presence of the first antenna pair 20A.

With reference back to FIG. 2A, in an embodiment, the antenna array structure 18 may be further used for ultra-wideband (UWB) sensing and radar application, in addition to enabling the PDoA functionality. In this regard, it is also necessary to achieve a low mutual coupling (a.k.a. higher isolation) between the active antenna elements $ANT_{A2}$ and $ANT_{A3}$.

Mutual coupling is a phenomenon that arises due to electromagnetic interactions and currents between the active antenna elements $ANT_{A2}$ and $ANT_{A3}$. This coupling effect can result in changes in the antenna's performance parameters, including gain, return loss, radiation pattern, efficiency, channel capacity, impedance matching, and power emitted. As such, it is critical to properly reduce mutual coupling to help improve the overall performance of the antenna array structure 18.

There exist many conventional methods for mitigating the mutual coupling between the active antenna elements $ANT_{A2}$ and $ANT_{A3}$. One such method involves adding slots between antenna elements to alter electromagnetic field distribution and thereby reduce the mutual coupling effect. Another technique involves adding an absorber metamaterial to absorb electromagnetic waves and thereby reduce the mutual coupling. Additionally, adding a wall around the active antenna elements $ANT_{A2}$ and $ANT_{A3}$ can also minimize the mutual coupling by blocking radiation from adjacent active antenna elements.

Figure 4B:
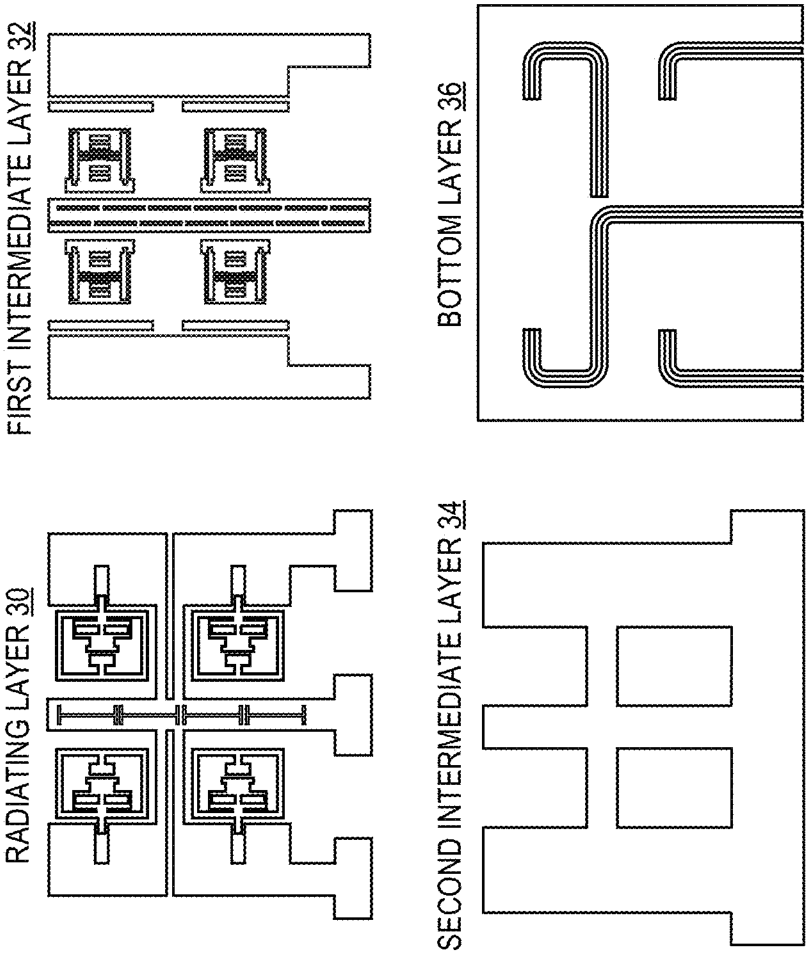
FIGS. 4A and 4B are schematic diagrams providing an exemplary illustration as to how the antenna array structure of FIG. 2A can be fabricated to further reduce mutual coupling between active antenna elements.
Figure 4A:
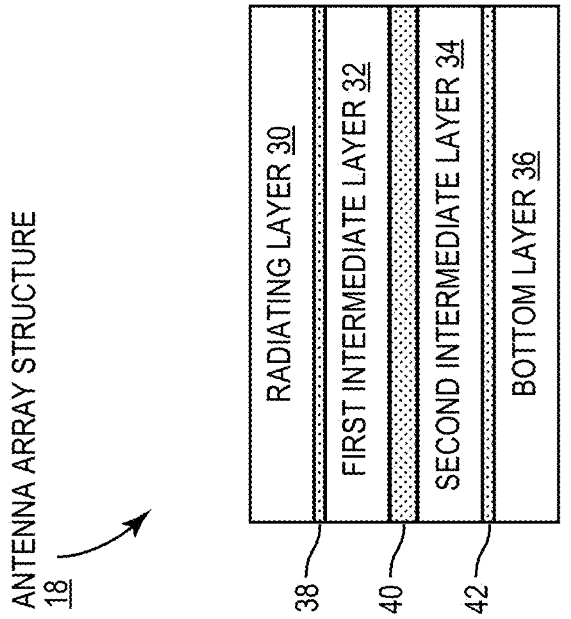

In this regard, FIGS. 4A and 4B are schematic diagrams providing an exemplary illustration as to how the antenna array structure 18 of FIG. 2A can be fabricated to further reduce mutual coupling between the active antenna elements $ANT_{A1}$, $ANT_{A2}$, $ANT_{A3}$. Common elements between FIGS. 2A, 4A, and 4B are shown therein with common element numbers and will not be re-described herein.

FIG. 4A is a schematic diagram providing an exemplary sideview of the antenna array structure 18 of FIG. 2A fabricated according to an embodiment of the present disclosure. Herein, the antenna array structure 18 is fabricated to include a radiating layer 30, a first intermediate layer 32, a second intermediate layer 34, and a bottom layer 36.

The active antenna elements $ANT_{A1}$, $ANT_{A2}$, $ANT_{A3}$ and the passive antenna element $ANT_P$ are all provided on the radiating layer 30. The first intermediate layer 32 is provided underneath the radiating layer 30, the second intermediate layer 34 is provided underneath the first intermediate layer 32, and the bottom layer 36 is provided underneath the second intermediate layer 34. Understandably, the radiating layer 30, the first intermediate layer 32, the second intermediate layer 34, and the bottom layer 36 may be interconnected through vias, which are omitted herein for the sake of simplicity.

The radiating layer 30 is separated from the first intermediate layer 32 by a first dielectric layer 38, the first intermediate layer 32 is separated from the second intermediate layer 34 by a second dielectric layer 40, and the second intermediate layer 34 is separated from the bottom layer 36 by a third dielectric layer 42. In a non-limiting example, the first dielectric layer 38 and the third dielectric layer 42 are made of FR4 dielectric constant material and the second dielectric layer 40 is made of composite dielectric material. The second dielectric layer 40 may be thicker than each of the first dielectric layer 38 and the third dielectric layer 42.

FIG. 4B is a schematic diagram providing an exemplary top view of the radiating layer 30, the first intermediate layer 32, the second intermediate layer 34, and the bottom layer 36 in the antenna array structure 18 in FIG. 4A. In an embodiment, the first intermediate layer 32 can be made using a material with negative permittivity in a higher portion of a frequency band and positive permittivity in a lower portion of the frequency band. By doing so, the electromagnetic waves will pass through a medium with negative permittivity or negative permeability, resulting in an imaginary propagation constant. This will cause an attenuation of a normal component of the electric field between the active antenna elements $ANT_{A2}$ and $ANT_{A3}$ to thereby mitigate the mutual coupling problem.

Figure 5:
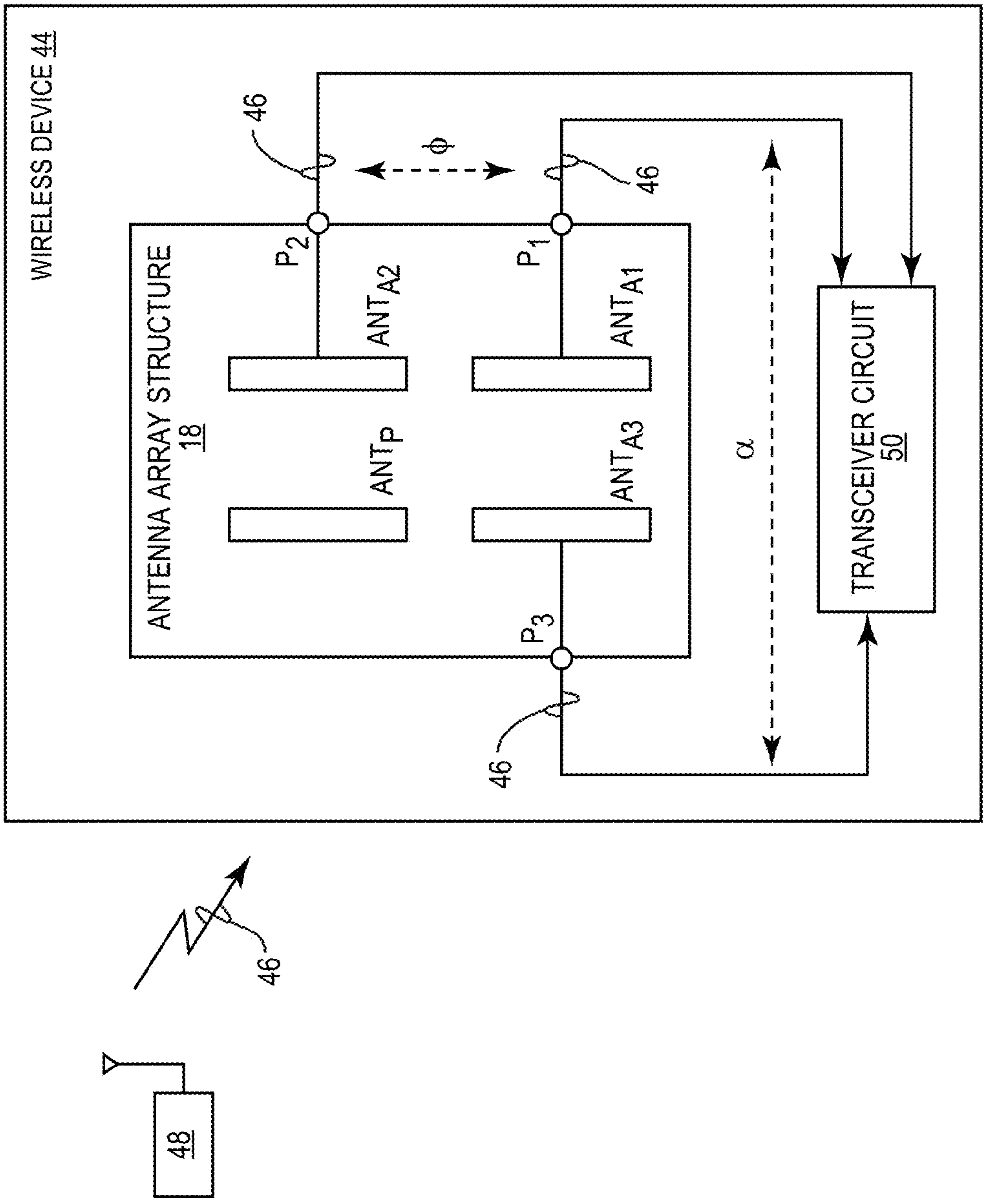
FIG. 5 is a schematic diagram of a wireless device incorporating the antenna array structure of FIG. 2A.

The antenna array structure 18 of FIG. 2A can be provided in a wireless device to enable many location-based services. In this regard, FIG. 5 is a schematic diagram of a wireless device 44 incorporating the antenna array structure 18 of FIGS. 2A and 2B. Common elements between FIGS. 2A, 2B, and 5 are shown therein with common element numbers and will not be re-described herein.

Herein, the active antenna elements $ANT_{A1}$, $ANT_{A2}$, $ANT_{A3}$ and the passive antenna element $ANT_P$ can each absorb electromagnetic energy of an RF signal 46 that is transmitted by a transmitter 48 in a frequency band. The active antenna elements $ANT_{A1}$, $ANT_{A2}$, $ANT_{A3}$ are further configured to provide the received RF signal 46 to the antenna ports $P_1$, $P_2$, $P_3$, respectively.

The wireless device 44 also includes a transceiver circuit 50, which is coupled to each of the antenna ports $P_1$, $P_2$, $P_3$. Accordingly, the transceiver circuit 50 can receive the RF signal 46, as received by the active antenna elements $ANT_{A1}$, $ANT_{A2}$, $ANT_{A3}$, concurrently via the antenna ports $P_1$, $P_2$, $P_3$.

The transceiver circuit 50 can then determine an elevation PDoA $\phi$ based on the RF signal 46 received via the active antenna elements $ANT_{A1}$, $ANT_{A2}$ (a.k.a. first antenna pair 20A) and an azimuth PDoA $\alpha$ based on the RF signal 46 received via the active antenna elements $ANT_{A1}$, $ANT_{A3}$ (a.k.a. second antenna pair 20B). The transceiver circuit 50 can then determine, based on the elevation PDoA $\phi$ and the azimuth PDoA $\alpha$, a respective angle-of-arrival (AoA) and a respective time-of-flight (ToF) of the RF signal 46 received from each of the antenna ports $P_1$, $P_2$, $P_3$. Subsequently, the transceiver circuit 50 may determine a location of the transmitter 48 in the azimuth-elevation coordinate system 10 of FIG. 1 based on the determined AoAs and the determined ToFs.

Figure 6:
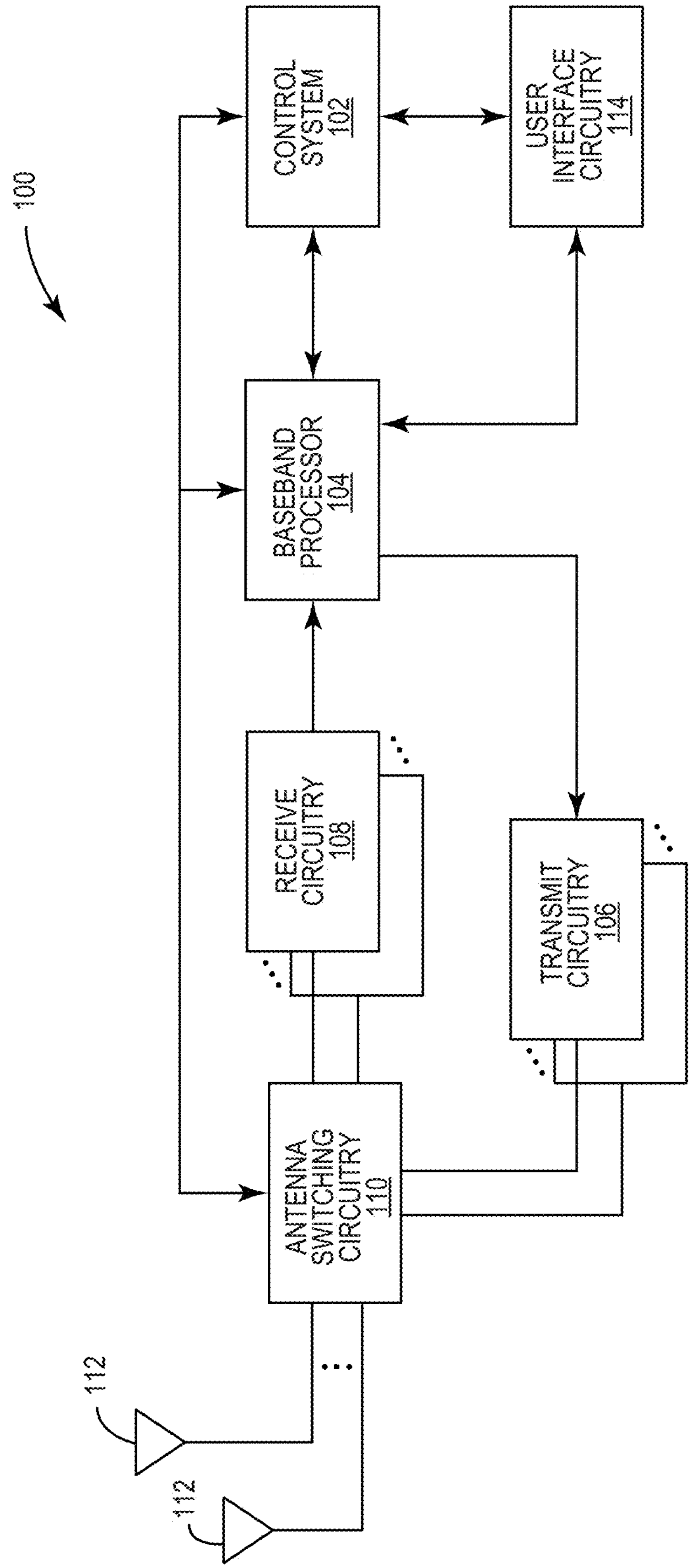
FIG. 6 is a schematic diagram of an exemplary communication device wherein the wireless device of FIG. 5 can be provided.

The wireless device 44 of FIG. 5, which includes the antenna array structure 18 of FIG. 2A can be provided in a communication device to enable the embodiments described above. In this regard, FIG. 6 is a schematic diagram of an exemplary communication device 100 wherein the wireless device 44 of FIG. 5 can be provided.

Herein, the communication device 100 can be any type of communication device, such as a mobile terminal, smart watch, tablet, computer, navigation device, access point, base station (e.g., eNB, gNB, etc.), and like wireless communication devices that support wireless communications, such as cellular, wireless local area network (WLAN), Bluetooth, UWB, and near field communications. The communication device 100 will generally include a control system 102, a baseband processor 104, transmit circuitry 106, receive circuitry 108, antenna switching circuitry 110, multiple antennas 112, and user interface circuitry 114. In a non-limiting example, the control system 102 can be a field-programmable gate array (FPGA), as an example. In this regard, the control system 102 can include at least a microprocessor(s), an embedded memory circuit(s), and a communication bus interface(s). The receive circuitry 108 receives radio frequency signals via the antennas 112 and through the antenna switching circuitry 110 from one or more base stations. A low noise amplifier and a filter cooperate to amplify and remove broadband interference from the received signal for processing. Downconversion and digitization circuitry (not shown) will then downconvert the filtered, received signal to an intermediate or baseband frequency signal, which is then digitized into one or more digital streams using an analog-to-digital converter(s) (ADC).

The baseband processor 104 processes the digitized received signal to extract the information or data bits conveyed in the received signal. This processing typically comprises demodulation, decoding, and error correction operations, as will be discussed in greater detail below. The baseband processor 104 is generally implemented in one or more digital signal processors (DSPs) and application specific integrated circuits (ASICs).

For transmission, the baseband processor 104 receives digitized data, which may represent voice, data, or control information, from the control system 102, which it encodes for transmission. The encoded data is output to the transmit circuitry 106, where a digital-to-analog converter(s) (DAC) converts the digitally encoded data into an analog signal and a modulator modulates the analog signal onto a carrier signal that is at a desired transmit frequency or frequencies. A power amplifier will amplify the modulated carrier signal to a level appropriate for transmission, and deliver the modulated carrier signal to the antennas 112 through the antenna switching circuitry 110. The multiple antennas 112 and the replicated transmit and receive circuitries 106, 108 may provide spatial diversity. Modulation and processing details will be understood by those skilled in the art.

Figure 7:
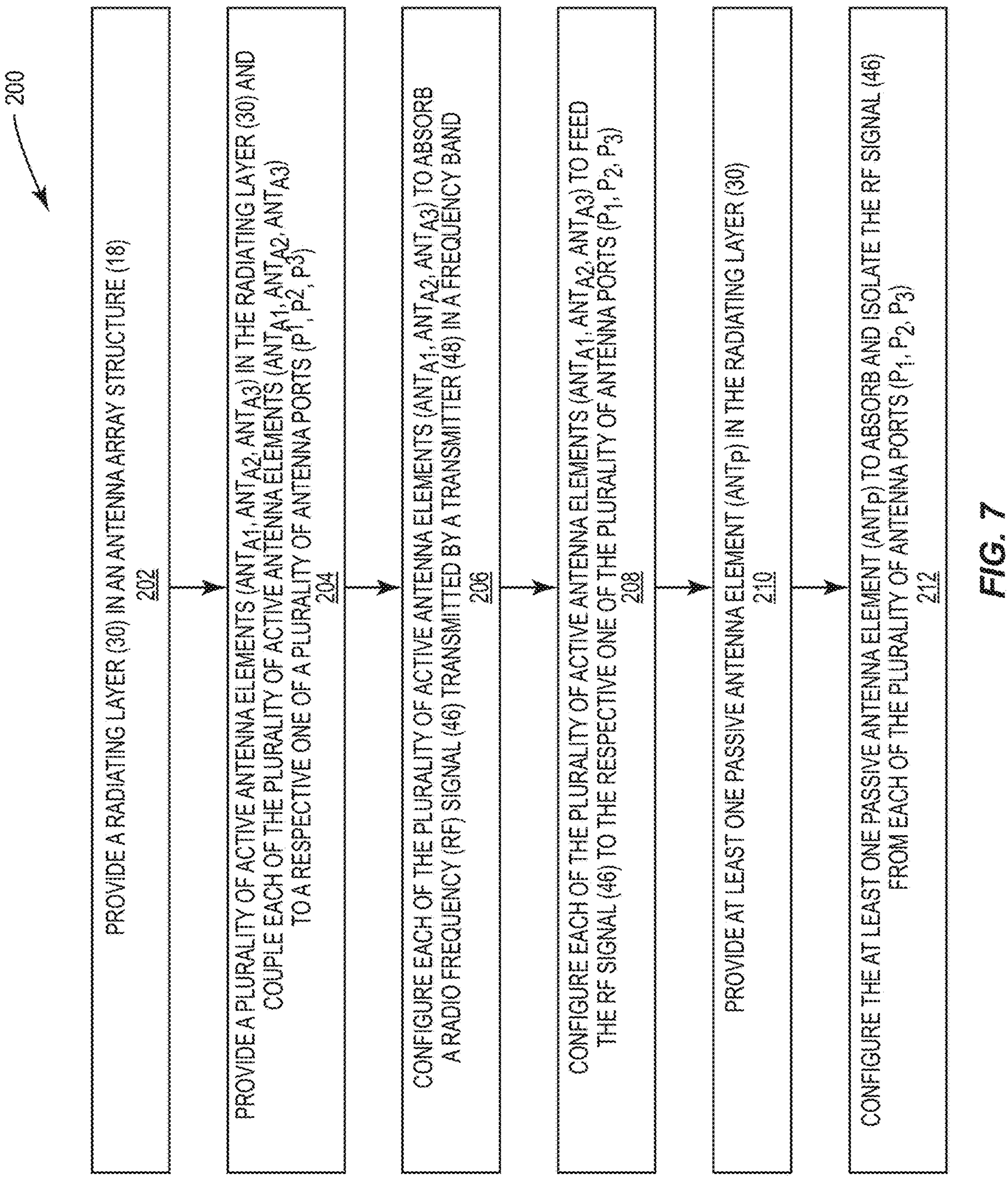
FIG. 7 is a flowchart of an exemplary process for fabricating the antenna array structure of FIG. 4A.

In an embodiment, the antenna array structure 18 of FIG. 4A can be fabricated based on a process. In this regard, FIG. 7 is a flowchart of an exemplary process 200 for fabricating the antenna array structure 18 of FIG. 4A.

Herein, the process 200 includes providing the radiating layer 30 in the antenna array structure 18 (step 202). The process 200 also includes providing the active antenna elements $ANT_{A1}$, $ANT_{A2}$, $ANT_{A3}$ in the radiating layer 30 and coupling each of the active antenna elements $ANT_{A1}$, $ANT_{A2}$, $ANT_{A3}$ to a respective one of the antenna ports $P_1$, $P_2$, $P_3$ (step 204). The process 200 also includes configuring each of the active antenna elements $ANT_{A1}$, $ANT_{A2}$, $ANT_{A3}$ to absorb the RF signal 46 transmitted by the transmitter 48 in the frequency band (step 206). The process 200 also includes configuring each of the active antenna elements $ANT_{A1}$, $ANT_{A2}$, $ANT_{A3}$ to feed the RF signal 46 to the respective one of the antenna ports $P_1$, $P_2$, $P_3$ (step 208). The process 200 also includes providing the passive antenna element $ANT_P$ in the radiating layer 30 (step 210). The process 200 also includes configuring the passive antenna element $ANT_P$ to absorb and isolate the RF signal 46 from each of the antenna ports $P_1$, $P_2$, $P_3$ (step 212).

Those skilled in the art will recognize improvements and modifications to the embodiments of the present disclosure. All such improvements and modifications are considered within the scope of the concepts disclosed herein and the claims that follow.

What is claimed is:

1. An antenna array structure comprising:
a radiating layer comprising:
a plurality of active antenna elements each coupled to a respective one of a plurality of antenna ports and configured to:
absorb a radio frequency (RF) signal transmitted by a transmitter in a frequency band; and
feed the RF signal to the respective one of the plurality of antenna ports, wherein the plurality of active antenna elements is configured to form a plurality of orthogonally related antenna pairs each configured to measure a respective one of a plurality of phase difference of arrival (PDoA) angles of the RF signal; and
at least one passive antenna element configured to:
absorb and isolate the RF signal from each of the plurality of antenna ports; and
decorrelate the plurality of PDoA angles measured by the plurality of orthogonally related antenna pairs.

2. The antenna array structure of claim 1, wherein the plurality of orthogonally related antenna pairs comprises:
a first antenna pair comprising a first one of the plurality of active antenna elements and a second one of the plurality of active antenna elements; and
a second antenna pair comprising the first one of the plurality of active antenna elements and a third one of the plurality of active antenna elements.

3. The antenna array structure of claim 2, wherein:
the first antenna pair is configured to measure an elevation PDoA angle of the RF signal;
the second antenna pair is configured to measure an azimuth PDoA angle of the RF signal; and
the at least one passive antenna element is further configured to decorrelate the measured elevation PDoA angle and the measured azimuth PDoA angle.

4. The antenna array structure of claim 2, further configured to reduce mutual coupling between the second one of the plurality of active antenna elements and the third one of the plurality of active antenna elements.

5. The antenna array structure of claim 4, further comprising a first intermediate layer provided underneath the radiating layer, the first intermediate layer having a material with negative permeability in a lower portion of the frequency band and positive permittivity in a higher portion of the frequency band to thereby reduce mutual coupling between the second one of the plurality of active antenna elements and the third one of the plurality of active antenna elements.

6. The antenna array structure of claim 5, further comprising:
a second intermediate layer provided underneath the first intermediate layer; and
a bottom layer provided underneath the second intermediate layer.

7. The antenna array structure of claim 6, further comprising:
a first dielectric layer provided between the radiating layer and the first intermediate layer;
a second dielectric layer provided between the first intermediate layer and the second intermediate layer; and
a third dielectric layer provided between the second intermediate layer and the bottom layer.

8. The antenna array structure of claim 7, wherein:
the first dielectric layer and the third dielectric layer are made of an FR4 dielectric constant material; and
the second dielectric layer is made of a composite dielectric material.

9. A wireless device comprising:
an antenna array structure comprising:
a plurality of active antenna elements each coupled to a respective one of a plurality of antenna ports and configured to:
absorb a radio frequency (RF) signal transmitted by a transmitter in a frequency band; and
feed the RF signal to the respective one of the plurality of antenna ports, wherein the plurality of active antenna elements is configured to form a plurality of orthogonally related antenna pairs each configured to measure a respective one of a plurality of phase difference of arrival (PDoA) angles of the RF signal; and
at least one passive antenna element configured to:
absorb and isolate the RF signal from each of the plurality of antenna ports; and
decorrelate the plurality of PDoA angles measured by the plurality of orthogonally related antenna pairs.

10. The wireless device of claim 9, wherein the plurality of orthogonally related antenna pairs comprises:
a first antenna pair comprising a first one of the plurality of active antenna elements and a second one of the plurality of active antenna elements; and
a second antenna pair comprising the first one of the plurality of active antenna elements and a third one of the plurality of active antenna elements.

11. The wireless device of claim 10, wherein:
the first antenna pair is configured to measure an elevation PDoA angle of the RF signal;
the second antenna pair is configured to measure an azimuth PDoA angle of the RF signal; and
the at least one passive antenna element is further configured to decorrelate the measured elevation PDoA angle and the measured azimuth PDoA angle.

12. The wireless device of claim 10, wherein the antenna array structure is further configured to reduce mutual coupling between the second one of the plurality of active antenna elements and the third one of the plurality of active antenna elements.

13. The wireless device of claim 9, further comprising a transceiver circuit coupled to each of the plurality of antenna ports and configured to:
receive the RF signal concurrently via the plurality of antenna ports;
determine, based on the plurality of measured PDoAs, a respective one of a plurality of angle-of-arrivals (AoAs) of the RF signal received via each of the plurality of antenna ports;
determine a respective one of a plurality of time-of-flights (ToFs) of the RF signal received via each of the plurality of antenna ports; and determine a location of the transmitter in an azimuth-elevation coordinate system based on the plurality of determined AoAs and the plurality of determined ToFs.

14. A method for fabricating an antenna array structure comprising:

providing a radiating layer in the antenna array structure;

providing a first intermediate layer underneath the radiating layer, the first intermediate layer having a material with negative permeability in a lower portion of a frequency band and positive permittivity in a higher portion of the frequency band;

providing a plurality of active antenna elements in the radiating layer and coupling each of the plurality of active antenna elements to a respective one of a plurality of antenna ports;

configuring each of the plurality of active antenna elements to absorb a radio frequency (RF) signal transmitted by a transmitter in the frequency band;

configuring each of the plurality of active antenna elements to feed the RF signal to the respective one of the plurality of antenna ports;

providing at least one passive antenna element in the radiating layer; and configuring the at least one passive antenna element to absorb and isolate the RF signal from each of the plurality of antenna ports.

15. The method of claim 14, further comprising:

providing a second intermediate layer underneath the first intermediate layer; and providing a bottom layer underneath the second intermediate layer.

16. The method of claim 15, further comprising:

providing a first dielectric layer between the radiating layer and the first intermediate layer;

providing a second dielectric layer between the first intermediate layer and the second intermediate layer; and providing a third dielectric layer between the second intermediate layer and the bottom layer.

17. The method of claim 16, further comprising:

making the first dielectric layer and the third dielectric layer with an FR4 dielectric constant material; and making the second dielectric layer with a composite dielectric material.

* * * * *